United States Patent [19]
de Vries

[11] 4,301,759
[45] Nov. 24, 1981

[54] CONTROL SYSTEM, PARTICULARLY FOR USE ON SHIPS

[75] Inventor: Dirk de Vries, Scharnegoutum, Netherlands

[73] Assignee: Stork Kwant B.V., Sneek, Netherlands

[21] Appl. No.: 4,560

[22] Filed: Jan. 18, 1979

Related U.S. Application Data

[63] Continuation-in-part of Ser. No. 766,852, Feb. 9, 1977, abandoned.

[30] Foreign Application Priority Data

Feb. 12, 1976 [NL] Netherlands .................... 7601464

[51] Int. Cl.³ .................... B63H 25/52; G05G 11/00
[52] U.S. Cl. .................... 114/144 E; 74/480 B
[58] Field of Search .................... 114/144 E, 144 R; 244/84, 83 E, 83 F, 83 G; 318/628; 328/71; 364/102; 235/307; 340/146.1 BE; 60/567; 74/480 R, 480 B; 371/36, 68; 180/139, 321

[56] References Cited

U.S. PATENT DOCUMENTS 3,999,726 12/1976 Carlson et al. .................... 244/83 J
4,099,476 7/1978 Inoue et al. .................... 114/144 R

FOREIGN PATENT DOCUMENTS 1945443 3/1971 Fed. Rep. of Germany ... 114/144 R

*Primary Examiner*—J. D. Miller
*Assistant Examiner*—Reinhard J. Eisenzopf
*Attorney, Agent, or Firm*—Silverman, Cass & Singer, Ltd.

[57] ABSTRACT

Control system, including a plurality of control members electrically coupled with one another and with a device to be controlled, particularly for controlling a ship's equipment, wherein each control member is provided with a potentiometer for generating electrical control signals, and each control member can be coupled with a follow-up member, the control member and the follow-up member being connected to a differential amplifier determining a signal which is characteristic of a difference in position of each control member and each follow-up member and forming control signals for the follow-up members, the follow-up members preferably being formed by a setting motor and a potentiometer coupled with the same.

8 Claims, 3 Drawing Figures

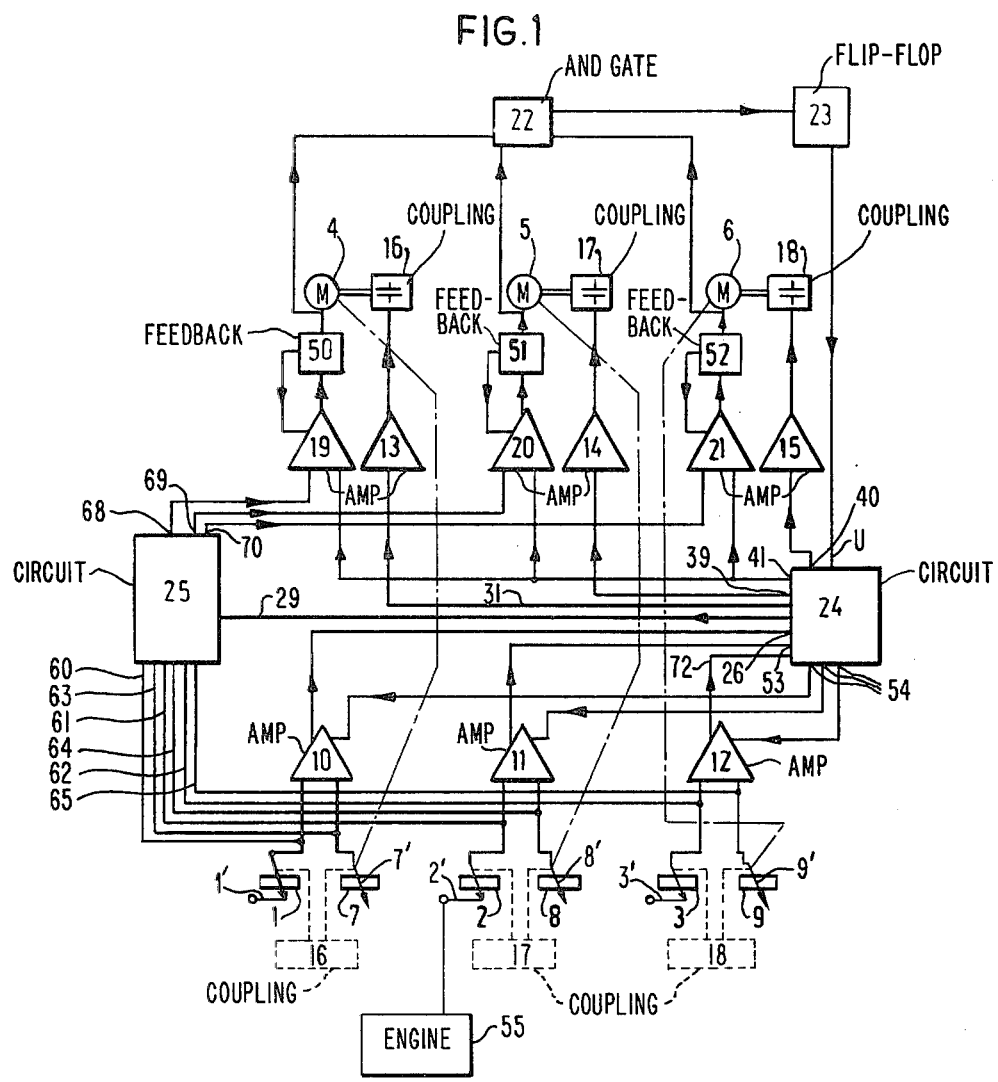

CONTROL SYSTEM, PARTICULARLY FOR USE ON SHIPS

BACKGROUND OF THE INVENTION

This application is a continuation in part of application Ser. No. 766,852, filed Feb. 9, 1977, now abandoned.

The invention relates to a control system comprising a plurality of control members electrically coupled with one another and with a device to be controlled, particularly for controlling a ship's equipment. In such a system, when one of the control members is actuated, follow-up members should follow the same. This applies particularly to the use of a ship's telegraphs and control handles for the remote control of the engine and/or adjustable screw blades on board. The system has to be particularly reliable in operation.

SUMMARY OF THE INVENTION

According to the invention this is achieved by providing each control member with means for generating electrical control signals and by providing the possibility of coupling each member with a follow-up member, the control member and the follow-up member being connected to means determining a signal which is characteristic of a difference in positions of each control member and each follow-up member and of the formation of control signals for the follow-up members. It is thus ensured that each of the control members can operate as a master, while the follow-up members will follow said member as slaves. This also applies, if the follow-up member of a control member operating as master fails to operate.

The follow-up member may be formed by a setting motor and a potentiometer coupled with the same, while also the control member may be formed by a potentiometer coupled with a control handle.

In order to avoid that a slight excursion in one of the control members should result in the other control members following said member, the control signals are only formed when the control signal exceeds a predetermined value.

In order to enable a post-adjustment or fine adjustment of a control member, control signals can be formed during a given period of time after the control signal has dropped below the predetermined value.

When a control member is actuated, the other control members of the system are coupled with the associated follow-up member to follow the position of the actuated control member.

BRIEF DESCRIPTION OF THE DRAWING

The invention will be described by way of example with reference to the accompanying drawing.

FIG. 1 is a schematic diagram of the system according to the invention, and

DESCRIPTION OF THE PREFERRED EMBODIMENT

Figure 3:
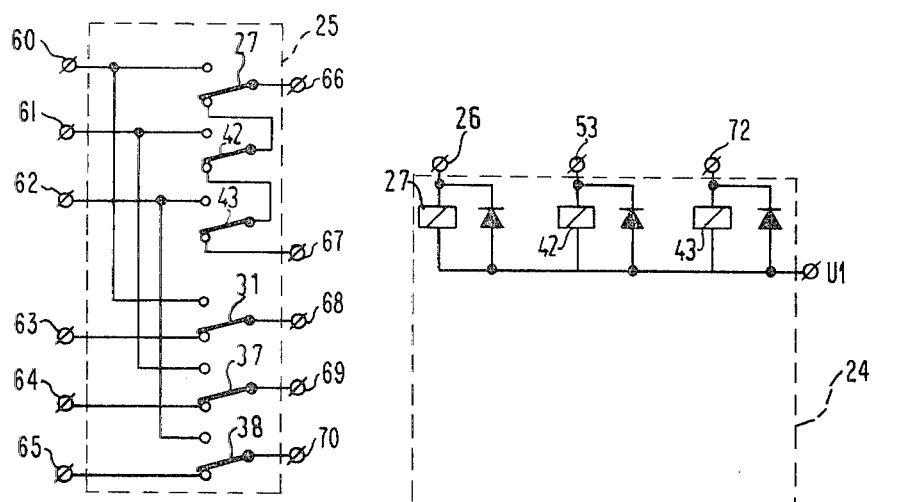
FIGS. 2 and 3 elucidate the blocks 24 and 25 in FIG. 1.
Figure 2:
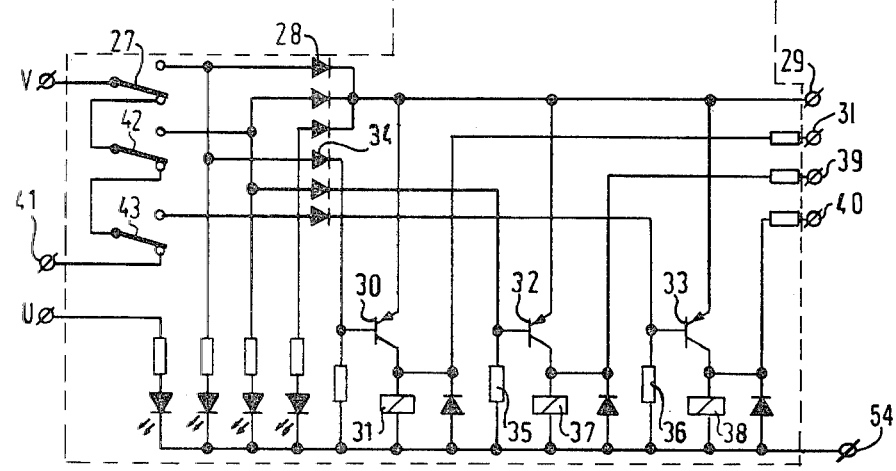

The embodiment of the system comprises three control members each having a potentiometer 1,2, and 3 respectively, coupled with a control handle 1', 2' and 3'. Additionally, there are three follow-up members, one associated with each control member. Each follow-up member has a potentiometer 7, 8 and 9 respectively, including follow-up arms 7', 8' and 9'. If the control handle 1' connected to potentiometer 1 is operated, the amplifier 10 will supply a control voltage based upon the difference in position between potentiometers 1 and 7. The control voltage from amplifier 10 is fed to terminal 26 of circuit 24 and energizes winding 27 of relay 27(FIG. 2). The relay 27 is closed (FIG.2, FIG.3). When relay 27 closes the voltage V is supplied to the emitters of transistors 30,32,33 through diode 28. Through diode 34 the same voltage V is supplied to the base of transistor 30. Since the base and the emitter of transistor 30 have the same voltage V transistor 30 is not conducting.

The bases of transistors 32 and 33 are respectively connected via resistors 35 and 36 to a source of low voltage. Transistors 32 and 33 are conducting and therefore the windings of relays 37 and 38 are energized. Relays 37 and 38 are closed. A voltage is fed to the output terminals 39 and 40. The output terminals 39 and 40 are respectively connected to an input of amplifiers 14 and 15. The amplifiers 14 and 15 actuate the couplings 17 and 18 respectively. The couplings 16,17,18 couple the control handles 1', 2' and 3' of the potentiometers 1,2,3 to the follow-up arms 7', 8' and 9' of potentiometers 7,8,9 respectively. This is illustrated in the lower part of FIG. 1 by the dashed outlines of couplings 16, 17 and 18 and the dashed lines therefrom to potentiometers 1 and 7, 2 and 8, and 3 and 9, respectively. The dashed outlines of couplings 16, 17 and 18 in the lower part of FIG. 1 are used in addition to the solid blocks of the same elements to avoid long connecting lines from the solid blocks representing the same. Since amplifier 13 is not actuated and amplifiers 14,15 are actuated, control handle 1' is not coupled to follow-up arm 7' and control handles 2', 3' are coupled to follow-up arms 8' and 9' respectively. Thus, a movement of follow-up arms 8', 9' results in a like movement of control handles 2' and 3', respectively.

Since relay 27 is switched-over, terminal 41 is disconnected from voltage V unabling or disabling amplifers 19,20,21 respectively.

While terminal 41 is disconnected from voltage V amplifiers 19,20 and 21 are enabled.

The amplifiers 19,20,21 are controlled by control signals corresponding to the difference between the voltages from potentiometers 1 and 7; 2 and 8; 3 and 9 respectively. The control signals are fed to the amplifiers through the contacts of relays 37,38 (FIG. 3) via leads 60–65 and 68–70 and terminal 29 (FIG. 2). The operational amplifiers 19,20, and 21 have feedback through elements 50,51,52 respectively. The output of the amplifiers 19,20,21 is connected servomotors 4,5,6 respectively. The servomotors 4,5,6 rotate the follow-up arms 7', 8' and 9' of potentiometers 7,8 and 9 respectively, and are permanently coupled to the follow-up arms as indicated by the dashed and dotted lines. As couplings 17 and 18 are actuated, potentiometers 2 and 3 and their respective control handles are rotated. Thus, couplings 16, 17 and 18 serve as mechanical couplings between the potentiometers. If the difference between the voltages between potentiometers 1 and 2; and 1 and 3 has become zero the servomotors will be stopped and all potentiometers 1,7,2,8,3,9 will be in the same position.

The outputs of the control amplifiers 19,20 and 21 are checked in a circuit 22, which can be formed by an AND gate. The output of circuit 22 indicates when the outputs of the amplifiers 19,20, and 21 are zero, that is to say, when the positions of the actuated control handles and their associated potentiometers 1,2,3 correspond to the follow-up member 7,8,9. In this case a time delay circuit 23 for example a monostable flip flop forms a timing signal, which is directly fed back via lead U, circuit 24 and lead 54, to the amplifiers 10,11 and 12. During said timing signal said amplifiers 10,11 and 12 are held in the open state for some time despite the fact that the difference signal has dropped below the minimum value. Consequently during said period of time "fine control" may be carried out. If one motor 4, 5, or 6 fails to operate, the associated control handle still permits the actuating of the potentiometer, which improves the reliability of operation. The device to be controlled, for example a propulsion engine 55 or control member for the screw blades may be coupled to one of the control handles such as 2'.

If one of the other control handles for example control handle 2' is operated, amplifier 11 will supply a control voltage to terminal 53(FIG. 2). Thereupon relay 42 is closed and transistors 30,33 will become conductive, whereas transistor 32 will not be conducting. Couplings 16 and 18 will be actuated and potentiometers 1 and 7; 3 and 9 will be coupled together.

From the above it will be clear that the described system is not a well-known master-slave system. The control handle which is operated is at that time the master and the other control handles function as slaves. Each of the control members can function as a master and at the same time the other control members are functioning as slaves.

What I claim is:

1. A control system for controlling a device, comprising:
    a plurality of control members electrically coupled with one another and the device, every control member including potentiometer means for generating an electrical potentiometer signal indicative of the position of the control member;
    a plurality of follow-up members which may be coupled to the control members, there being one follow-up member for each control member, every follow-up member including movement means for moving the follow-up member, and every follow-up member including potentiometer means for generating an electrical potentiometer signal indicative of the position of the follow-up member;
    a plurality of differential means, each connected to the potentiometer means of a corresponding pair of a control member and a follow-up member, the differential means generating a difference signal representing the difference in position of the control member and the follow-up member; and
    control signal means coupled to the differential means for providing control signals to the movement means in response to the difference signals so that the follow-up members may be aligned in position with the control members.

2. The control system as claimed in claim 1 in which the movement means includes a setting motor and the potentiometer means of the follow-up member includes a potentiometer, the potentiometer being coupled with the setting motor.

3. The control system as claimed in claim 1 in which the potentiometer means of the control member is a potentiometer.

4. The control system as claimed in claim 1 in which every control member includes a handle coupled with the potentiometer means.

5. The control system as claimed in claim 1 in which the control signals are produced while the difference signals exceed a certain value.

6. The control system as claimed in claim 5 in which the control signals may be formed for a period of time after the difference signals are less than the certain value.

7. The control system as claimed in claim 1 further including coupling means for every pair of a control member and a follow-up member, the coupling means for coupling the control member to the follow-up member so that the control member follows the movement of the follow-up member.

8. The control system as claimed in claim 7 further including circuit means coupled with the control members and the coupling means so that while one control member is being operated, the coupling means couple the other control members to their associated follow-up member.

* * * * *